United States Patent
Watanabe et al.

(10) Patent No.: US 6,357,660 B1
(45) Date of Patent: Mar. 19, 2002

(54) BAR CODE READING APPARATUS AND A METHOD FOR THE SAME

(75) Inventors: Mitsuo Watanabe; Isao Iwaguchi; Hiroaki Kawai, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/282,468

(22) Filed: Mar. 31, 1999

(30) Foreign Application Priority Data

Dec. 17, 1998 (JP) .......................................... 10-359710

(51) Int. Cl.$^7$ ............................ G06K 7/10; G06K 19/06
(52) U.S. Cl. ........................... 235/462.16; 235/462.19
(58) Field of Search ................. 235/462.01, 462.07, 235/462.09, 462.16, 462.17, 462.18, 462.19, 462.25

(56) References Cited

U.S. PATENT DOCUMENTS

| 3,882,464 A | * | 5/1975 | Zamkow | 235/462.19 |
|---|---|---|---|---|
| 4,147,295 A | * | 4/1979 | Nojiri et al. | 235/462.19 |
| 4,438,327 A | * | 3/1984 | Smith | 235/462.19 |
| 4,528,443 A | * | 7/1985 | Smith | 235/462.19 |
| 5,451,761 A | | 9/1995 | Kawai et al. | 235/462.07 |
| 5,502,296 A | * | 3/1996 | Kawai et al. | 235/462.07 |
| 5,525,785 A | * | 6/1996 | Kawai et al. | 235/462.07 |
| 5,821,520 A | * | 10/1998 | Mulla et al. | 235/462.16 |
| 5,942,740 A | * | 8/1999 | Watanabe et al. | 235/462.16 |
| 6,032,862 A | * | 3/2000 | Watanabe et al. | 235/462.01 |
| 6,299,064 B2 | * | 10/2001 | Watanabe et al. | 235/462.16 |

FOREIGN PATENT DOCUMENTS

| JP | 6-36065 | | 2/1994 |
|---|---|---|---|
| JP | 7-175632 A | * | 7/1995 |
| JP | 7-230522 | | 8/1995 |
| JP | 9-6885 A | * | 1/1997 |

OTHER PUBLICATIONS

Office Action of corresponding Korean application, 519980964415, dated May 31, 2001, with Japanese translation.

* cited by examiner

Primary Examiner—Michael G. Lee
Assistant Examiner—Jared J. Fureman
(74) Attorney, Agent, or Firm—Armstrong, Westerman & Hattori, LLP

(57) ABSTRACT

A bar code reading apparatus including a reader for reading a bar code expressing a plurality of characters, and a CPU for decoding the characters according to a result of reading by the reader. A ratio between a character length $C_y$ of an already decoded character E2 and a length $C_z$ of a character E7 to be decoded is calculated. When this ratio is greater than a threshold value, the black bar width $B_1$ and black bar width $B_2$ are corrected according to a reference black bar width X. The CPU decodes the character E7 to be decoded according to the corrected black bar width $B_1$ and black bar width $B_3$.

6 Claims, 12 Drawing Sheets

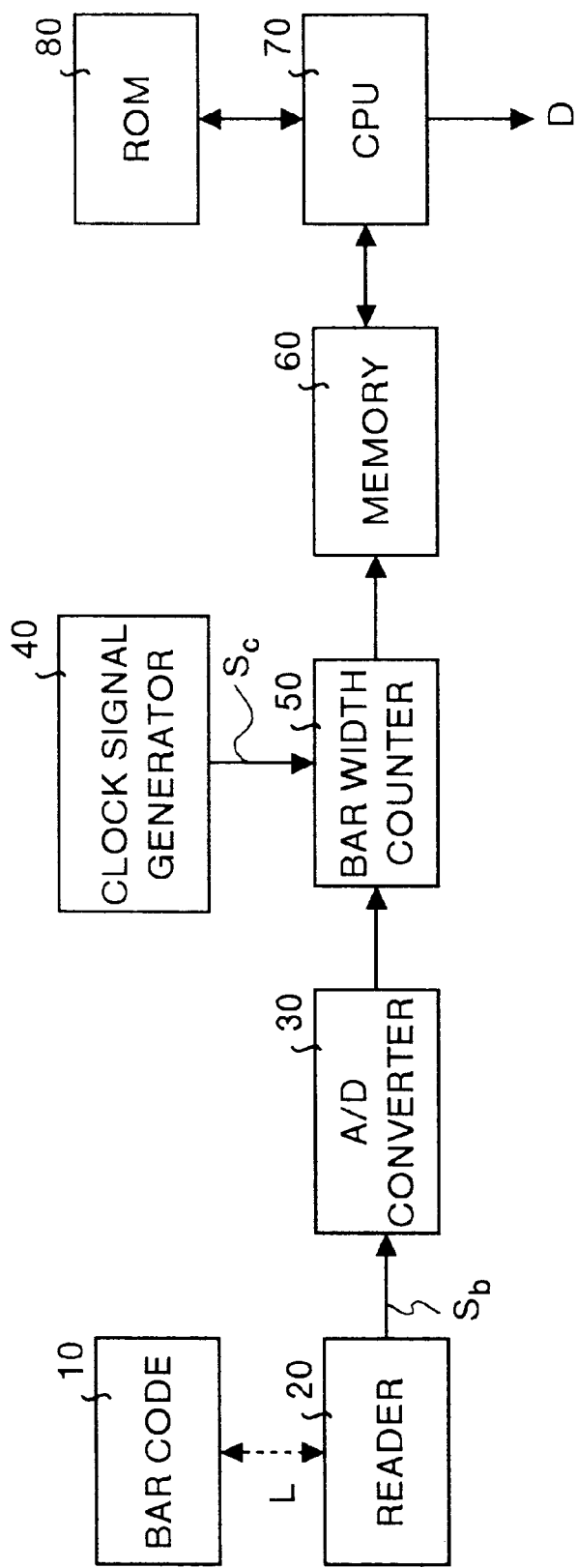

FIGURE EXPLAINING THE OPERATIONS OF THE BAR CODE READING
APPARATUS ACCORDING TO EMBODIMENT 1
FIG.2A
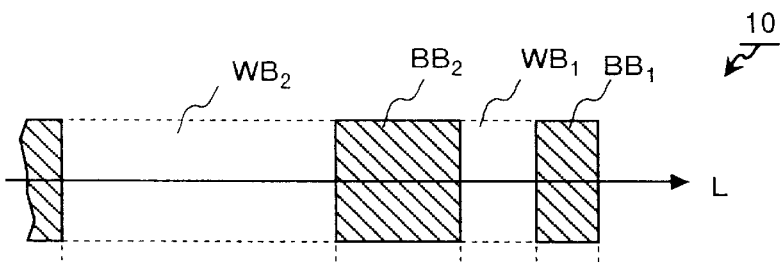
FIG.2B
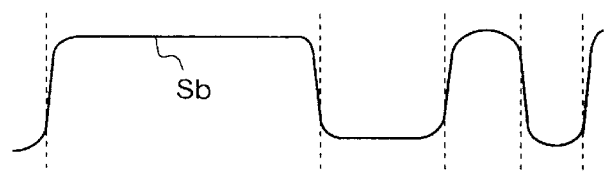
FIG.2C
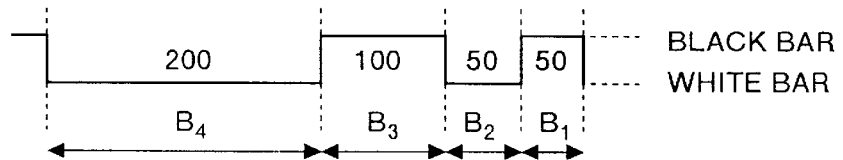
FIG.2D
| $B_1$ | 50 |
| --- | --- |
| $B_2$ | 50 |
| $B_3$ | 100 |
| $B_4$ | 200 |

FLOW CHART FOR EXPLAINING THE OPERATIONS OF
THE BAR CODE READING APPARATUS ACCORDING TO EMBODIMENT 1

FLOW CHART FOR EXPLAINING THE OPERATIONS OF THE BAR CODE READING APPARATUS ACCORDING TO EMBODIMENT 2

FIGURE SHOWING A PRINTING PRECISION TABLE

TOP VIEW SHOWING THE BAR CODE 10

FIGURE SHOWING THE CHARACTERS E4, E6, E2, AND E8

FIGURE SHOWING THE CHARACTERS
O0 TO O9 AND CHARACTERS E0 TO E9

FIGURE FOR EXPLAINING A METHOD OF
DETERMINING THE NUMBER OF MODULES

THE FIRST DECODING TABLE 100

| T1 \ T2 | 2 | 3 | 4 | 5 |
|---|---|---|---|---|
| 2 | E6 | O0 | E4 | O3 |
| 3 | 09 | E2 / E8 | O1 / O7 | E5 |
| 4 | E9 | O2 / O8 | E1 / E7 | O5 |
| 5 | O6 | E0 | O4 | E3 |

FIG.11

THE SECOND DECODING TABLE 200

200

| B1\B3 | 1 | 2 | 3 |
|---|---|---|---|
| 1 | E7 / E8 | O1 | — |
| 2 | O2 | E1 / E2 | O7 |
| 3 | — | O8 | — |

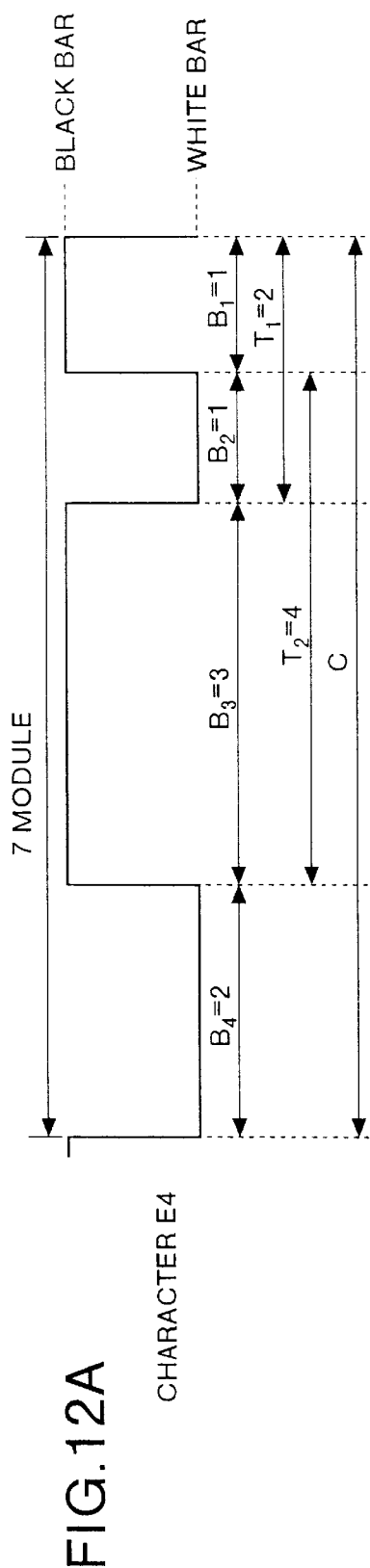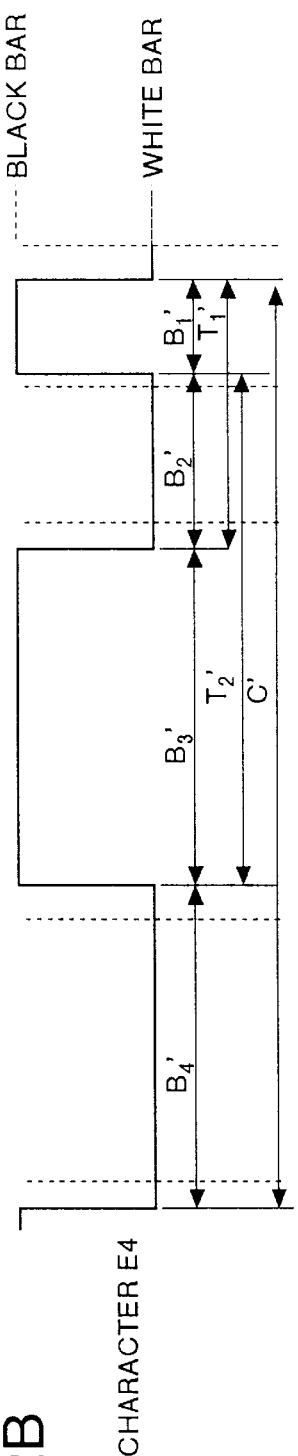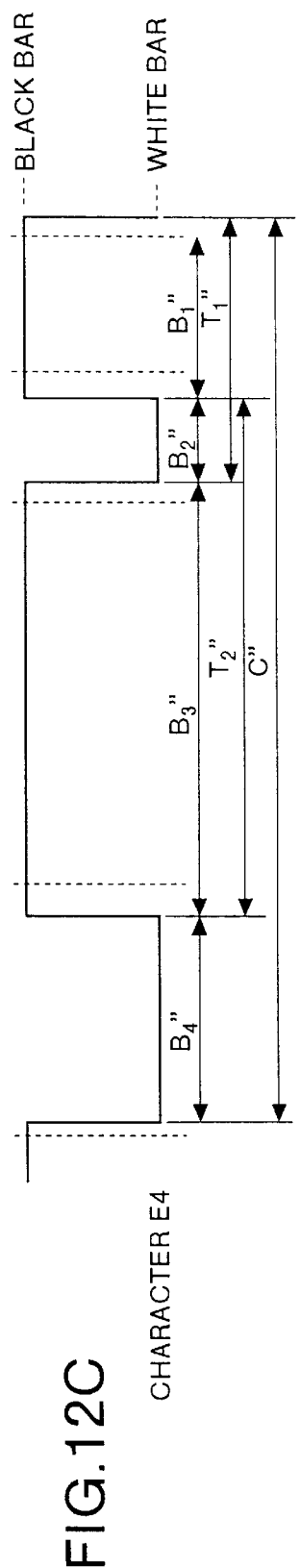

FLOW CHART FOR EXPLAINING THE OPERATIONS OF
THE BAR CODE READING APPARATUS
BASED ON CONVENTIONAL TECHNOLOGY

FIGURE SHOWING ALREADY DECODED CHARACTER E1 AND A CHARACTER TO BE DECODED E7

BAR CODE READING APPARATUS AND A METHOD FOR THE SAME

BACKGROUND OF THE INVENTION

1. Field of the Invention

The present invention relates to a bar code reading apparatus for decoding a character from bar code data read from a reflected light from a bar code expressing a character with bars having different widths.

2. Description of the Related Art

In recent years, the POS (Point of Sales) system is becoming increasingly popular so as to grasp the contents of sales of a product more quickly with less labor in retail shops such as convenience stores, department stores, and super markets. In such a POS system, there is placed a bar code reading apparatus for optically reading the bar code attached to a product expressing a character and decoding the character according to a result of reading operation.

There is sometimes a non-uniformity of bar widths in a bar code because of a difference in the printing precision, therefore there is a strong need in the bar code reading apparatus that it should execute high precision character decoding by not being affected by such a non-uniformity.

A bar code attached to a product (not shown), comprises a plurality of black bars and a plurality of white bars placed alternately, and expresses overall 20 types of characters from E(for Even)0 to E9 and O(for Odd) 0 to O9 described later.

As the bar code described above, there are bar code symbols defined as those for JAN (Japan Article Number), WPC (World Product Code) commonly available all over the world, EAN (European Article Number) used in Europe, and UPC (Universal Product Code) used in the United States.

FIG. 6 is a top view showing an example of a bar code 10. The bar code shown in this figure has, for instance, a black bar $BB_1$, a white bar $WB_1$, a black bar $BB_2$, and a white bar $WB_2$. Also the bar code 10 comprises a left block 11 expressing a product manufacturer code, a right block 12 expressing a product item code at the right side of the left block 11 with a center bar 13 therebetween, and a left guard bar 14 and a right guard bar 15 provided at the left edge of the left block 11 and at the right edge of the right block 12, respectively.

As shown in FIG. 7A to FIG. 7D, one character in the bar code 10 comprises four bars (elements), namely a first black bar, a second white bar, a third black bar, and a fourth white bar arrayed from the right side to the left side of the figure, and the character length (width) C (an inter-edge distance from the first black bar to the fourth white bar) is assumed as 7 modules (the unit length is described as "module" herein).

The bar code 10 basically expresses 10 types of figures (characters) from "0" to "9" with combinations of a black bar width $B_1$ of the first black bar, a white bar width $B_2$ of the second white bar, a black bar width $B_3$ of the third black bar, and a white bar width $B_4$, but as shown in FIG. 8, it is possible to express 20 types of characters with the same figures by introducing two types of combinations in which a total number of modules for black bars is regarded as an even number or an odd number.

Herein a bar code in which the total number of modules for black bars is an odd number is described as odd (simply described as O hereinafter) and a bar code in which the total number of modules for black bars is an even number is described as even (simply described as E hereinafter). In the case shown in FIG. 8, 10 types of characters in which a total number of modules for black bars indicating character O0 to character O9 is an odd number and 10 types of character in which a total number of modules for black bars indicating character E0 to character E9 is an even number, totally 20 types of characters are shown.

To describe by referring to the character O0 and character E0 as examples, the character O0 from the right side to the left side in the figure consists of a first black bar (one module), a black white bar (one module), a third black bar (two modules), and a fourth white bar (three modules). Thus, in the character O0, the sum of the number of modules for the first black bar (=1 module) and for the third black bar (=2 modules) is three modules which is an odd number.

On the other hand, the character E0 consists of, from the right side to the left side in the figure, a first black bar (three modules), a second white bar (two modules), a third black bar (one module), and a fourth white bar (one module). Thus, in the character E0, the sum of the number of modules for the first black bar (=3 modules) and for the third black bar (=1 module) is four modules which is an even number.

The character E4 shown in FIG. 7A consists of, from the right side to the left side in the figure, a one module black bar having the black bar width $B_1$, a one module white bar adjoining the black bar and having the white bar width $B_2$, a three modules black bar adjoining the white bar and having the black bar width $B_3$, and a two modules white bar adjoining the black bar and having the white bar width $B_4$.

Herein, a sum of the black bar width $B_1$ and white bar width $B_2$, namely the inter-edge distance between the first black bar and second white bar is called as delta distance $T_1$, and in the example shown in the figure, the delta distance $T_1$ is two modules. Further, a sum of the white bar width $B_2$ and the black bar width $B_3$, namely the inter-edge distance between the second white bar and the third black bar is called as delta distance $T_2$, and in the example shown in the figure, this delta distance $T_2$ is four modules.

The delta distance $T_1$, delta distance $T_2$, black bar width $B_1$, and black bar width $B_3$ are important parameters used to identify which of the characters O0 to O9 and characters E0 to E9 the character corresponds to.

Namely, as shown in FIG. 8, the delta distance $T_1$ in each of the characters O0 to O9 is different from the delta distance $T_2$ in each of the characters E0 to E9, so that the character is identified from the delta distance $T_1$ and delta distance $T_2$. In this operation for identifying a character, a first decoding table 100 of FIG. 10 showing a relation between combination patterns of the delta distance $T_1$ and delta distance $T_2$ and characters is used.

It should be noted that, in the characters E2 and E8, characters O2 and O8, characters O1 and O7, and characters E1 and E7, the delta distance $T_1$ and delta distance $T_2$ in each of the combinations are identical to each other, therefore as shown in FIG. 10, and the character cannot be identified from the delta distance $T_1$ and delta distance $T_2$.

To describe more specifically using the characters E2 and character E8 as examples, the delta distance $T_1$ is three modules and also the delta distance $T_2$ is three modules in both these characters, namely the two delta distances are equal to each other, so that to which of the characters E2 and character E8 the character to be identified corresponds to can not be identified only from the delta distance $T_1$ and delta distance $T_2$.

By using the fact that a black bar width for the first black bar and that for the third black bar are different from each other in the characters E2 and E8, character O2 and O8, characters O1 and O7, and characters E1 and E7, it is possible to identify the character from both or either one of the black bar widths.

To describe more specifically using the characters E2 and character E8 shown in FIG. 8 as examples, in the character E2, a black bar width of the first black bar is two modules, and a black bar width of the third black bar is two modules. On the other hand, in the character E8, a black bar width of the first black bar is one module, and a black bar width of the third black bar is one module, so that the black bar width in each bar of the character E8 is different from that in each bar of the character E2. Therefore, it is possible to identify the characters E2 and character E8 from the black bar width of the first black bar and that of the third black bar. It is needless to say that the character can be identified by checking the width of only one black bar.

To identify the characters O1 and E7, characters O2 and O8, characters E1 and E7, and characters E2 and E8 described above, each of which can not be identified even by using the first decoding table 100 (Refer to FIG. 10), a second decoding table 200 of FIG. 11 showing a relation between the combination patterns of the black bar width $B_1$ of the first black bar and the black bar width $B_3$ and characters is used.

In the conventional technology, a bar code reading apparatus is used as an apparatus for reading and also decoding the bar code 10 described above. This type of bar code reading apparatus generally comprises a reader for optically reading the bar code, and a CPU (Central Processing Unit) for decoding the characters expressed by the bar code 10.

Operation of a bar code reading apparatus based on the conventional technology is described with reference to the flow chart shown in FIG. 13. When the printing precision of the bar code 10 degrades, there exist thin black bars having a width narrower as compared to the width of a regular black bar and also thick black bars having a width wider as compared to the regular black bar.

To describe more specifically, FIG. 12B shows that the black bar width $B_1'$ and black bar width $B_3'$ are narrower as compared to the regular black bar width $B_1$ and black bar width $B_3$ (Refer to FIG. 12A), while FIG. 12C shows that the black bar width $B_1''$ and black bar width $B_3''$ are wider as compared to the regular black bar width $B_1$ and black bar width $B_3$ (Refer to FIG. 12A).

So the black bar widths $B_1'$, $B_3'$, $B_1''$, $B_3''$ or the like each include a printing error. Because of this error, it is difficult to determine an accurate number of modules. Therefore, there has been proposed a technology for correcting a black bar width of a character to be decoded by using a bar width of an already decoded character having a known number of modules.

Next, operation for decoding the decoded character E7 according to the decoded character $E_1$ is described in FIG. 14. At first, the CPU (not shown herein) executes the step SA1 shown in FIG. 13 to compute the number of modules for each of the delta distance $T_1$ and delta distance $T_2$ in the character E7. In the example shown in FIG. 14, the CPU computes, from the equations (1) and (2) described below, the number of modules $T_{1m}$ for the delta distance $T_1$ as four and the number of modules $T_{2m}$ for the delta distance $T_2$ as four, and then shifts the processing to step SA2.

$$T_{1m}=INT\ (T_1/(C_z/7)+0.5) \quad (1)$$

$$T_{2m}=INT\ (T_2/(C_z/7)+0.5) \quad (2)$$

In the equations (1) and (2) described above, $C_z$ indicates a length of a character to be decoded, while INT indicates rounding of the "$T_1/(C_z/7)$" in the parenthesis.

Namely, INT indicates an operation for computing the number module as one when the values obtained through the expressions of "$T_1/(C_z/7)+0.5$" and "$T_2/(C_z/7)+0.5)$" are in the range from 0.5 to 1.5, as two when the above values are in the range from 1.5 to 2.5, as three when the above values are in the range from 2.5 to 3.5, as four when the above values are in the range from 3.5 to 4.5, and as five when the above values are 4.5 or more.

In step SA2, the CPU accesses the first decoding table 100 shown in FIG. 10 to decode the characters, and then shifts the processing to step SA3. In this case, the delta distance $T_1$ is four modules and also the delta distance $T_2$ is four modules, so that the CPU regards a result of decoding as the character E1 or character E7. In this case, as the decoded character is either the character E1 or character E7, so that the decoded character can not be identified.

When the characters are identified as the characters E(O)1, E(O)7, E(O)2, and E(O)8, the character cannot be decoded by referring to only the first decoding table 100, and in that case the character decoding must be executed by using the second decoding table 200 (Refer to FIG. 11).

Hereinafter the characters E(O)1, E(O)7, E(O)2 and E(O)8 (shown simply as 1, 7, 2, and 8 in FIG. 13) as corrected characters. In the corrected characters, an error in the width of a black bar must be corrected to prevent the influence of the narrower or wider bar code 10 as compared to the width of a regular bar.

In step SA3, the CPU determines whether the character decoded in step SA2 is a corrected character or not, and when a result of determination is "NO", the CPU shifts the processing to step SA7. If a result of determination in step SA3 is "NO", it indicates that character decoding has been completed with the first decoding table 100. In this case, as the character is a corrected character (either one of character E1 and character E7), the CPU regards a result of determination in step SA3 as "YES", and shifts the processing to step SA4.

In step SA4, to prevent influence generated when a width of the bar code 10 becomes narrow or wide as compared to the regular one because of the degradation in the printing precision, the CPU corrects the black bar width $B_1$ shown in FIG. 14 by referring to the reference black bar width X as a reference, and then shifts the processing to step SA5.

In step SA5, the CPU computes the number of modules for the reference black bar width X (described as reference black bar width module number $X_m$ hereinafter), and then computes the number of modules for the corrected black bar width $B_1$ according to the result of computing as well as to the method of determination as shown in FIG. 9.

Namely, the CPU computes the number of modules for the corrected black bar width $B_1$ by subtracting a width difference $\Delta X$ (a difference between the number of modules for the reference black bar width X and the number of modules for the black bar width $B_1$) from the reference black bar width number of modules number $X_m$ and according to the determination method shown in FIG. 9. Also the CPU computes the number of modules for the corrected black bar width $B_3$ according to the same procedure as that used when computing the number of modules for the black bar width $B_1$, and then shifts the processing to step SA6.

In step SA6, the CPU applies the black bar width $B_1$ and black bar width $B_3$ to the second decoding table 200 (Refer to FIG. 11) to identify a character, and then shifts the processing to step SA7. In step SA7, the CPU computes a module number for the black bar width $B_1$ for decoding the next characters by regarding the black bar width $B_1$ as the reference black bar width X and finishes the character decoding.

By the way, the bar width correcting method in a bar code reading apparatus based on the conventional technology is effective when narrowing or widening of bars due to an error generated when a bar code is printed appears homogeneously. However, when narrowing and widening of bars due to a printing error does not appear homogeneously like in a case where length (width) of each character in a bar code is different from each other an error is generated when the bar widths are corrected.

Because of this problem, in the step SA6 shown in FIG. 13, when the black bar width $B_1$ (=1 module) and black bar width $B_3$ are applied to the second decoding table 200 (Refer to FIG. 11), as clearly shown in the figure, any corresponding character does not exist, so that decoding can not be executed. This is caused by the fact that it is generally assumed in the bar code reading apparatus based on the conventional technology that narrowing or widening of black bars appears at the same ratio throughout a bar code and that correction is executed by referring the reference black bar width X as a reference.

Namely, in the example shown in FIG. 14, there is a difference between length (width) of the decoded character $C_y$ (=198 counts) and length (width) of a character to be decoded $C_z$ (=211), and because of this non-uniformity in length of the character in the bar code 10, an error is generated in the decoding described above, especially in correction of bar width in each character to be decoded.

SUMMARY OF THE INVENTION

The present invention was made under the circumstances as described above, and it is an object of the present invention to provide a bar code reading apparatus which can execute character decoding without being affected by non-uniformity in width of each character in a bar code and a method for the same.

According to the present invention, a ratio computing unit computes a ratio between a character width of an already decoded character and that of a character to be decoded, and when this ratio is greater than a threshold value, a first correcting unit corrects a bar width of bars each constituting a character to be decoded by referring to a bar width of the reference bar corrected by the second correcting unit, so that character decoding can be executed correctly without being affected by a non-uniformity in a width of each character expressed by a bar code.

When the width of each character in a bar code changes at the same ratio, a difference between a character width of an already decoded character and that of a character to be decoded is not generated, so that a ratio computed by the ratio computing unit is less than the threshold value.

When the ratio is less, the first correcting unit corrects the bar width of each bar constituting the character to be decoded by referring to a bar width of a reference bar not corrected by the second correcting unit. Then, decoding of the character to be decoded is executed by a decoding unit according to a bar width of the already decoded character.

On the other hand, when widths of characters in a bar code change at different ratios a difference is generated between the widths of the already decoded characters and those of characters to be decoded, so that a ratio computed by the ratio computing unit is greater (hereinafter greater shall mean greater or equal to) than the threshold value.

When the ratio is greater, the first correcting unit corrects a bar width of bars each constituting the character to be decoded. Then, the characters to be decoded are decoded by the decoding unit according to the bar width of the already decoded character.

According to the present invention, a printing precision computing unit computes the printing precision of a bar code, and when the printing precision is lower than a threshold value, a first correcting unit corrects a bar width of bars each constituting a character to be decoded according to a bar width of the reference bar corrected by the second correcting unit, so that character decoding can correctly be executed without being affected by a non-uniformity in a width of each character in a bar code.

When the printing precision in a bar code degrades (when a width of each character changes at a different ratio respectively), the first correcting unit corrects a bar width of bars each constituting a character to be decoded according to a bar width of the reference bar corrected by the second correcting unit. Then, decoding of the character to be decoded is executed by a decoding unit according to a bar width of the already decoded character.

According to the present invention, the printing precision computing unit computes printing precision by comparing a bar width of at least reference bar in the already decoded character to that of the character to be decoded.

Even when the printing precision which is a ratio between a character width of the already decoded character and that of the character to be decoded changes the character decoding can correctly be executed without being affected by a non-uniformity in a width of each character in a bar code.

According to the present invention, a ratio between a character width of an already decoded character and that of a character to be decoded is computed, and when the ratio is greater than a threshold value, in a first correcting step, a correction of the bar width of bars each constituting the character to be decoded is executed by referring to a bar width of the reference bar corrected in a second correcting unit, so that character decoding can correctly be executed without being affected by a non-uniformity in a width of each character in a bar code.

When the width of each character in a bar code changes at the same ratio a difference between a character width of the already decoded character and that of a character to be decoded is not generated, so that the ratio computed in the ratio computing step is less than the threshold value.

When the ratio is less, in the first correcting step the bar width of bars each constituting a character to be decoded is corrected according to a bar width of the reference bar not corrected in the second correcting step. Then, decoding of the character to be decoded is executed in the decoding step according to a bar width of the already decoded character.

On the other hand, when a width of each character in a bar code changes at a different ratio respectively a difference is generated between the widths of the already decoded characters and those of the character to be decoded, so that the ratio computed in the ratio computing step is greater than the threshold value.

When the ratio is greater, in the first correcting step, correction of a bar width of characters each constituting a character to be decoded is executed according to a bar width of the reference bar corrected in the second correcting step. Then, the character to be decoded is decoded in the decoding step according to the bar width of the already decoded character.

According to the present invention, when printing precision in a bar code is degraded (when a width of each character changes at a different ratio respectively), in a first correcting step the correction of a bar width of bars each constituting a character to be decoded is executed according to a bar width of the reference bar corrected in a second correcting step. Then, the character to be decoded is decoded in the decoding step according to the bar width of the already decoded character.

Thus, the printing precision of a bar code is computed and when the printing precision worst than a threshold value, in the first correcting step correction of a bar width of bars each constituting a character to be decoded is executed according to a bar width of the reference bar corrected in the second correcting step, so that character decoding can correctly be executed without being affected by a non-uniformity of a width of each character in a bar code.

According to the present invention, in the printing precision computing step, printing precision is computed by comparing a width of at least one reference bar in the already decoded character to that of a character to be decoded.

Thus, even when the printing precision which is a ratio between a width of the already decoded character and that of a character to be decoded changes, the character decoding can correctly be executed without being affected by the non-uniformity of a width of each character in a bar code.

Other objects and features of this invention will become apparent from the following description with reference to the accompanying drawings.

BRIEF DESCRIPTION OF THE DRAWINGS

FIG. 1 is a block diagram showing configuration of a bar code reading apparatus according to Embodiment 1 of the present invention;

FIGS. 2A to 2D explain the operation of the bar code reading apparatus according to Embodiment 1;

FIG. 11 is a view showing the second decoding table 200;

FIG. 12A to FIG. 12C are views for explaining the situation in which a character has become generally wider or narrower as compared to the original one;

DESCRIPTION OF THE PREFERRED EMBODIMENTS

Figure 3:
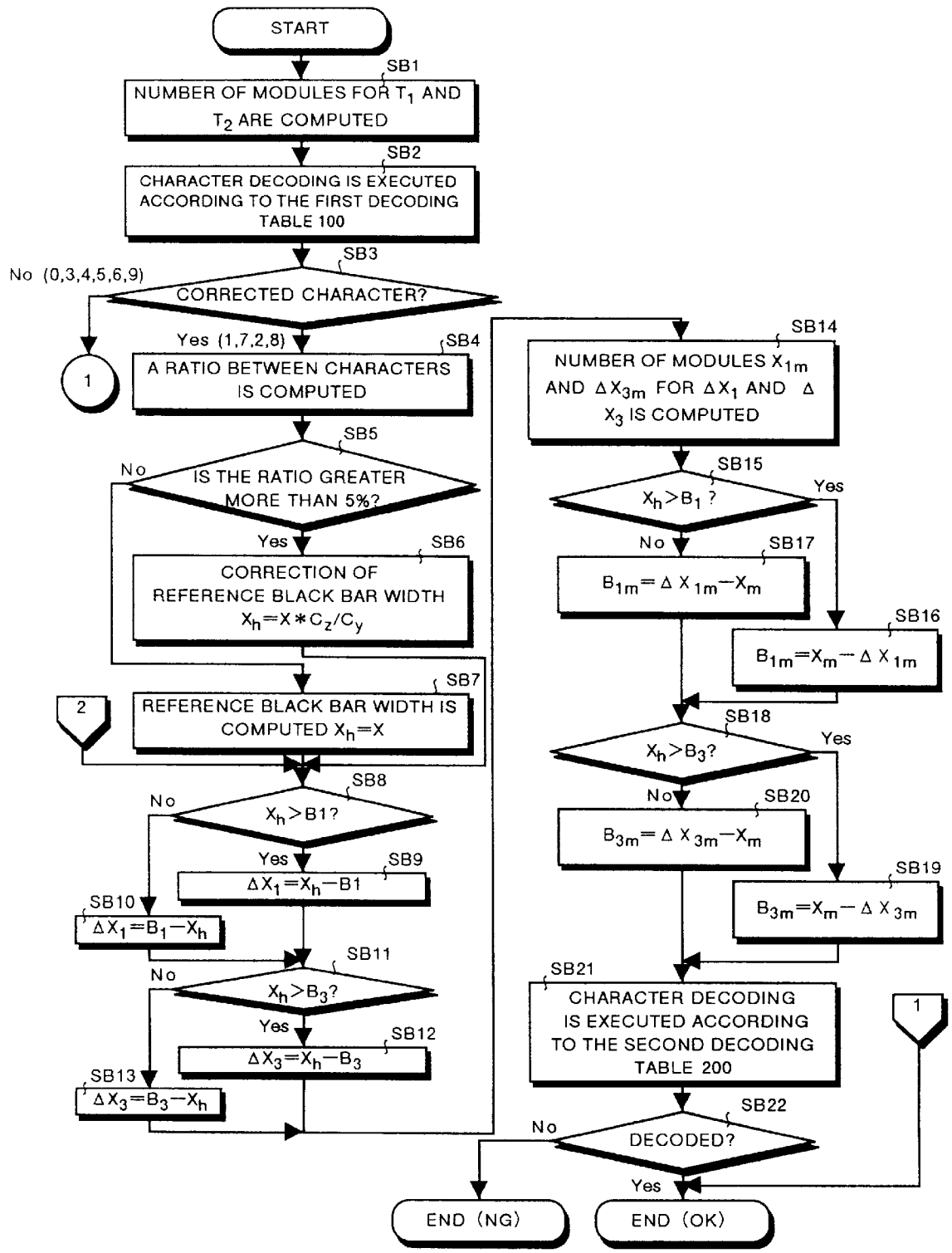
FIG. 3 is a flow chart for explaining the operations of the bar code reading apparatus according to Embodiment 1.

Detailed description is made hereinafter for Embodiments 1 and 2 of the bar code reading apparatus according to the present invention with reference to the related drawings.

FIG. 1 is a block diagram showing configuration of the bar code reading apparatus according to Embodiment 1 of the present invention. In this figure, the bar code 10 (Refer to FIG. 6) is attached to a product not shown herein, and comprises a plurality of black bars and a plurality of white bars placed alternately to express overall 20 types of characters of E0 to E9 and O0 to O9.

A reader 20 optically reads the bar code 10, and outputs a result of reading as a read signal $S_b$, and generally comprises a laser oscillator (not shown) for irradiating a laser beam L to the bar code 10, and a light receiver (not shown) for receiving the laser beam L reflected from the bar code 10 and generating the read signal $S_b$.

More specifically, the reader 20 receives the laser beam L irradiated to the bar code 10 shown in FIG. 2A and reflected from the bar code 10, and outputs the read signal $S_b$ having the waveform as shown in FIG. 2B. Level of the read signal $S_b$ corresponds to any of the black bar $BB_1$, white bar $WB_1$, black bar $BB_2$, and white bar $WB_2$ shown in FIG. 2A. Namely, reflection coefficients of the black bars $BB_1$ and $BB_2$ are low, so that a level of the read signal $S_b$ corresponding to these bars is low, and on the other hand, reflection coefficients of the white bars $WB_1$ and $WB_2$ are high, so that a level of the read signal $S_b$ corresponding to these bars is high.

Referring again to FIG. 1, an A/D (Analog/Digital) converter 30 executes processing for digitizing the read signal $S_b$ as shown in FIG. 2C by comparing the read signal $S_b$ shown in FIG. 2B to a threshold value. A clock signal generator 40 generates a clock signal $S_c$ with a specified frequency. A bar width counter 50 counts up clocks in synchronism to the clock signal $S_c$ supplied from the clock signal generator 40, and measures, of the digitized read signals $S_b$, those for the black bar width $B_1$, white bar width $B_2$, black bar width $B_3$, and white bar width $B_4$ each shown in FIG. 2C as count values. In the example shown in FIG. 2C, the black bar width $B_1$ is considered as 50 counts, white bar width $B_2$ as 50 counts, black bar width $B_3$ as 100 counts, and white bar width $B_4$ as 200 counts.

A memory 60 stores the data for the count values counted by the bar width counter 50 above correlating the data to the black bar width $B_1$, white bar width $B_2$, ... as shown in FIG. 2D. A CPU 70 decodes the characters in the bar code 10 according to the data for each count value stored in the memory 60, the first decoding table 100 (Refer to FIG. 10), and second decoding table 200 (Refer to FIG. 11), and outputs a result of decoding as decoded data D. Details of operation of the CPU 70 is described later. A ROM 80 stores the first decoding table 100, the second decoding table 200, and the programs to be executed in the CPU 70.

Next, operations of the bar code reading apparatus according to the Embodiment 1 are described with reference to the flow chart shown in FIG. 3.

In FIG. 1, when a laser beam L is irradiated from a laser oscillator (not shown) in the reader 20 to the bar code 10 to read the bar code, the read signal $S_b$ is outputted through the operations described above from a light receiver of the reader 20 to the A/D converter 30. The inputted read signal $S_b$ is compared to the threshold value in the A/D converter 30 with the read signal $S_b$ digitized as shown in FIG. 14, and this digitized read signal $S_b$ is counted in the bar width counter 50.

Figure 14:
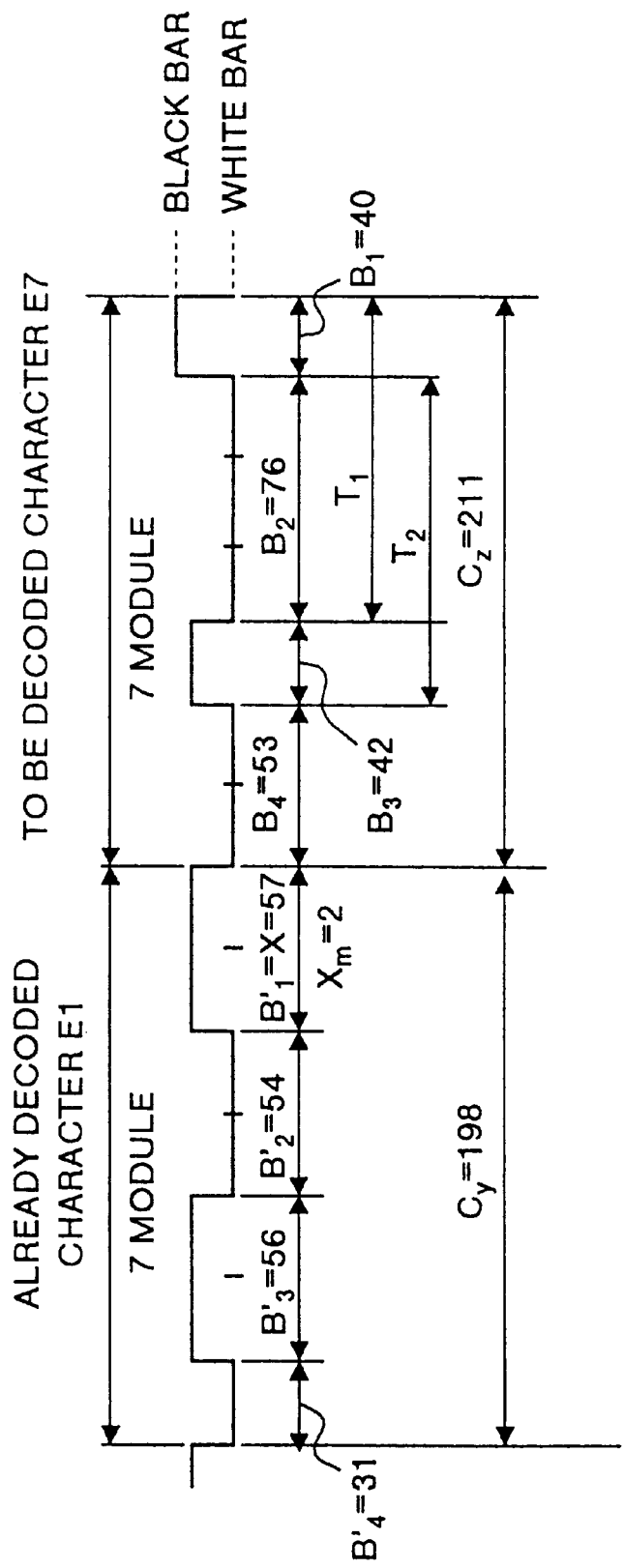
FIG. 14 is a view showing the already decoded character E1 and the character E7 to be decoded.

FIG. 14 shows an example in which the character E1 is followed by the character E7 as described above, and the character E1 is an already decoded character while the character E7 is a character to be decoded.

It is assumed herein that a black bar width $B_1'$=57 counts, a white bar width $B_2'$=54 counts, a black bar width $B_3'$=56 counts and a white bar width $B_4'$=31 counts, and a length (width) of the already decoded character $C_y$ =198 counts are stored in the memory 60. Herein, the black bar width $B_1'$ in the already decoded character E1 is designated as a reference black bar width X. Further, it is also assumed herein that, as a result of counting for the character E7 to be decoded, the black bar width $B_1=40$ counts, white bar width $B_2=76$ counts, black bar width $B_3=42$ counts, and white bar width $B_4=53$ counts, and length (width) of a character to be decoded $C_z=211$ counts are stored in the memory 60.

In this state, the CPU 70 (Refer to FIG. 1) shifts the processing to step SB1 shown in FIG. 3, and computes the number of modules for the delta distance $T_1$ and delta distance $T_2$ in the character E7. More specifically, the CPU 70 at first divides length $C_z$ of the character to be decoded (=211 counts) in the character E7 by 7 (modules) to obtain length of one module in the character E7 (=$C_z/7$).

Next, the CPU 70 computes a sum (=116 counts) of the black bar width $B_1$ (=40 counts) and white bar width $B_2$ (=76 counts) as the delta distance $T_1$, and similarly computes a sum (=118 counts) of the white bar width $B_2$ (=76 counts) and black bar width $B_3$ (=42 counts).

Then the CPU 70 computes a module number $T_{1m}$ for the delta distance $T_1$ and a module number $T_2m$ for the delta distance $T_2$ by substituting the delta distance $T_1$, delta distance $T_2$, length of one module (=$C_z/7$) into the following equations (1) and expression (2).

$$T_{1m}=\text{INT } (T_1/(C_z/7)+0.5) \quad (1)$$

$$T_{2m}=\text{INT } (T_2/(C_z/7)+0.5) \quad (2)$$

In the example shown in FIG. 14, the CPU 70 computes a module number for the delta distance $T_1$ as four and that for the delta distance $T_2$ also as four, and then shifts the processing to step SB2. In step SB2, the CPU 70 accesses the first decoding table 100 shown in FIG. 10 to execute character decoding, and then shifts the processing to step SB3. In this example, the number of modules for the delta distance $T_1$ is four modules and that for the delta distance $T_2$ is also four modules, so that the CPU 70 determines that a result of decoding indicates the character is character E1 or character E7.

As described above, the characters E(O)1, E(O)7, E(O)2 and E(O)8 (shown simply as 1, 7, 2, and 8 in FIG. 3) are corrected characters, so that the character E1 or E7 is a corrected character.

In step SB3, the CPU 70 determines as to whether the character decoded in step SB2 is a corrected character or not, and when it is determined that the character is not a corrected character ("NO" in step SB3), namely when the decoded character is character other than the corrected character, the CPU 70 outputs the decoding data D for the decoded character to a not illustrated host computer or the like, and terminates the operation for decoding the character. In this case, since the character is a corrected character (either the character E1 or character E7), so that the CPU 70 regards a result of determination in step SB3 as "YES", and shifts the processing to step SB4.

In step SB4, the CPU 70 computes a ratio between a character length of the already decoded character and a character length of a character to be decoded. More specifically, the CPU 70 computes the decoded character length $C_y$ for the already decoded character E1 (=198 counts) shown in FIG. 14 and a character length $C_z$ (=211 counts) of the character E7 to be decoded ($|C_y/C_z|$), and then shifts the processing to step SB5. In this case, the ratio is 6.16% (hereinafter all the figures are rounded to the third digit after a decimal point).

In step SB5, the CPU 70 determines as to whether the ratio computed in step SB4 is greater than the threshold value (for instance, 5%) or not. The threshold value is used to determine whether all the black bars in the bar code 10 shown in FIG. 6 have become generally wider (or narrower), or whether only some of the black bars have become wider (or narrower). In other words, the threshold value is a value indicating a degree of error in a character length/bar width in each character.

Namely, when all of the black bars in the bar code 10 have generally become wider (or narrower), the character length C for each character will have the same value, and when only some of the black bars have become wider (or narrower), it indicates that a non-uniformity in each character length C in the bar code 10 has been generated.

When it is determined in step SB5 for determining a ratio that the ratio is greater than the threshold value, it is regarded that a non-uniformity in each character length C in the bar code 10 has been generated, and when the ratio is smaller than the threshold value, the error is slight, and it is regarded that each character length C in the bar code 10 is equal to each other. In this example, as the ratio is 6.16% ($\geq 5\%$), the CPU 70 recognizes that there is a non-uniformity between the length $C_y$ of the already decoded character and the length $C_Z$ of the character to be decoded, regards a result of determination in step SB5 as "YES", and shifts the processing to step SB6.

In step SB6, the CPU 70 corrects the reference black bar width X shown in FIG. 14. More specifically, the CPU 70 computes the corrected reference black bar width $X_h$ by substituting the reference black bar width X (=57 counts), length $C_y$ of the decoded character (=198 counts), and length $C_z$ of the character to be decoded (=211 counts) into the following expression (3), and then shifts the processing to step SB8.

$$X_h=X \cdot (C_z/C_y) \quad (3)$$

In this case, the reference black bar width $X_h$ is computed as 60.74 counts through the expression of (57·(211/198)).

In step SB8, the CPU 70 determines as to whether the corrected reference black bar width $X_h$ (=60.74 counts) is greater than the black bar width $B_1$ (=40 counts) or not. In this case, as there is the relation of $X_h>B_1$, shifts the processing to step SB9. In step SB9, the CPU 70 computes the black bar width difference $\Delta X_1$ (20.74 counts) by subtracting the black bar width B1 (=40 counts) from the corrected reference black bar width $X_h$ (=60.74 counts), and then shifts the processing to step SB11.

On the other hand, when it is determined in step SB8 that the reference black bar width $X_h$ is less than the black bar width B1, the CPU 70 regards a result of determination as "NO", and then shifts the processing to step SB10. In step SB10, the CPU 70 computes the black bar width difference $\Delta X_1$ by subtracting the reference black bar width $X_h$ from the black bar width $B_1$, and then shifts the processing to step SB11. In step SB11, the CPU 70 determines as to whether the corrected reference black bar width $X_h$ (=60.74 counts) is greater than the black bar width $B_3$ (=42 counts) or not. In this example, as $X_h$ is larger than $B_3$, the CPU 70 regards a result of determination in step Sb11 as "YES", and then shifts the processing to step SB12.

In step SB12, the CPU 70 computes the black bar width difference $\Delta X_3$ (=18.74 counts) by subtracting the black bar width $B_3$ (=42 counts) from the corrected reference black bar width $X_h$ (=60.74 counts), and then shifts the processing to step SB14. On the other hand, when it is determined in step SB11 that the reference black bar width $X_h$ is less than the black bar width $B_3$, the CPU 70 regards a result of determination as "NO", and then shifts the processing to step SB13. In step SB13, the CPU 70 computes the black bar width difference $\Delta X_3$ by subtracting the reference black bar width $X_h$ from the black bar width $B_3$, and then shifts the processing to step SB14.

In step SB14, the CPU 70 computes a black bar width difference module number $\Delta X_{1m}$ for the black bar width difference $\Delta X_1$ (=20.74 counts) computed in step SB9 (or in step SB10) and a black bar width difference module number $\Delta X_{3m}$ for the black bar width difference $\Delta X_3$ (=18.74 counts) computed in step SB12 (or in step SB13). More specifically, the CPU 70 obtains a result of division of the black bar width difference $\Delta X_1$ (=20.74) by a count number for one module in the decoded character E7 (=$(C_z/7)$=(211/7)=30.14 counts) as the black bar width difference module number $\Delta X_{1m}$. In this case, this black bar difference module number $\Delta X_{1m}$ is 0.69.

Similarly, the CPU 70 obtains a result of dividing the black bar difference $\Delta X_3$ (=18.74) by a count number for one module in the character E7 to be decoded (=$(C_z/7)$=30.14 counts) the processing as the black bar difference module number $\Delta X_{3m}$, and then shifts to step SB15. In this case, this black bar difference module number $\Delta X_{3m}$ is 0.62.

In step SB15, the CPU 70 determines as to whether the corrected reference black bar width $X_h$ (=60 counts) is greater than the black bar width $B_1$ (=40 counts) or not. In this case, as $X_h$ is greater than $B_1$, the CPU 70 regards a result of determination as "YES", and then shifts the processing to step SB16. In step SB16, the CPU 70 computes a reference black bar width module number $X_m$ for the corrected reference black bar width $X_h$ (=60.74 counts). More specifically, the CPU 70 computes the reference black bar width module number $X_m$ from a result of dividing the reference black bar width $X_h$ (=60.74) by a count number for one module in the already decoded character E1 (=$(C_y/7)$= (198/7)=28.28 counts and according to the determination method shown in FIG. 9.

In this case, a result of division (=60.74/28.28) is 2.15, so that the module number $X_m$ becomes two.

Figures 9, 10:
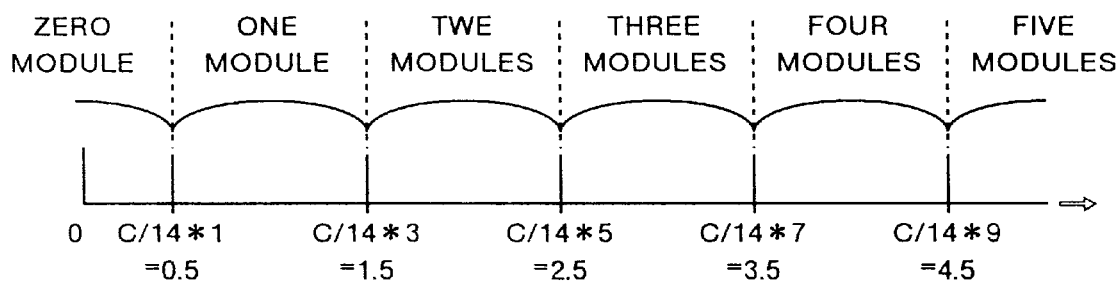
FIG. 9 is a view showing a method of determining the number of modules.
FIG. 10 is a view showing the first decoding table 100.

Then, the CPU 70 computes a black bar module number width $B_{1m}$ for the black bar $B_1$ by subtracting the black bar width difference module number $\Delta X_{1m}$ (=0.69 module) from the reference black bar width module number $X_m$ (=2 modules) and also according to the determination method shown in FIG. 9. In this case, the result of subtraction (2–0.69) is 1.31, and also the value is in the range from 0.5 to 1.5 as shown in FIG. 9, so that the black bar width module number $B_{1m}$ becomes one module.

On the other hand, when it is determined in step SB15 that the reference black bar width $X_h$ is less than the black bar width $B_1$, the CPU 70 regards a result of determination as "NO", and shifts the processing to step SB17. In step SB17, contrary to step SB16, the CPU 70 computes the black bar module number width $B_{1m}$, according to a result of subtracting the reference black bar width module number $X_m$ from the black bar width difference module number $\Delta X_{1m}$, and then shifts the processing to step SB18.

In step SB18, the CPU 70 determines as to whether the corrected reference black bar width $X_h$ (=60.74 counts) is greater than the black bar width $B_3$ (=42 counts) or not. In this case, as $X_h$ is greater than $B_3$, the CPU 70 regards a result of determination as "YES", and then shifts the processing to step SB19.

In step SB19, the CPU 70 computes a reference black bar width module number $X_m$ for the corrected reference black bar width $X_h$ (=60.74 counts) as two according to the method described in relation to step SB16, and then computes a black bar module number width $B_{3m}$ for the black bar width $B_3$ by subtracting the black bar width difference module number $\Delta X_{3m}$ (0.62 module) from the reference black bar width module number $X_m$ (=2 modules) and also according to the determination method shown in FIG. 9.

In this case, as a result of subtraction (2–0.62) is 1.38 and also as the result is in the range from 0.5 to 1.5 shown in FIG. 9, the black bar module number width $B_{3m}$ is computed as one module. On the other hand, when it is determined in step SB18 that the reference black bar width $X_h$ is less than the black bar width $B_3$, the CPU 70 regards a result of determination as "NO", and shifts the processing to step SB20. In step SB20, contrary to step SB19, the CPU 70 computes the black bar module number width $B_3m$ by subtracting the reference black bar width module number $X_m$ from the black bar width difference module number $\Delta X_{3m}$, and then shifts the processing to step SB21.

In step SB21, the CPU 70 executes character decoding by applying the black bar module number width $B_{1m}$ (=1 module) computed in step SB16 (or in step SB17) and black bar module number width $B_{3m}$ (=1 module) computed in step SB19 (or in step SB20) to the second decoding table 200 shown in FIG. 11.

In this case, the CPU 70 decodes the character E7 by applying the black bar module number width $B_{1m}$ (=1 module) as the black bar width $B_1$ the second decoding table 200 shown in FIG. 11 and also the black bar module number width $B_{3m}$ (=1 module) as the black bar width $B_3$ therein, outputs decoded data D for this character E7 to a host computer or other related sections not shown herein, and shifts the processing to step SB22.

Namely, in this case, as shown in FIG. 14, there is a difference between a character length $C_z$ of the character E7 and a decoded character length $C_y$ of the character E1, in other words, although there is a non-uniformity in each character length in the bar code 10 the character E7 is correctly been decoded.

In step SB22, the CPU 70 determines whether character decoding has correctly been executed or not, and in the example described above, the CPU regards a result of determination as "YES", and terminates the operation for decoding the character (OK in step SB22). On the other hand, if character decoding has not correctly been executed, the CPU 70 recognizes a result of determination in step SB22 as "NO", and terminates the operation for decoding characters (NG in step SB22).

In the step SB5 described above, when it is determined that the ratio is less than the threshold value (=5%), the CPU 70 recognizes that there is not much difference between a character length $C_z$ of the character E7 and a decoded character length $C_y$ of the character E1, regards a result of determination as "NO", and shifts the processing to step SB7. In step SB7, the CPU 70 sets the reference black bar width X as the reference black bar width $X_h$, and then shifts the processing to step SB8 to execute the steps described above. In other words, in step SB7, the reference black bar width X is not corrected, and is used as the reference black bar width $X_h$ as it is in the subsequent steps.

Figure 13:
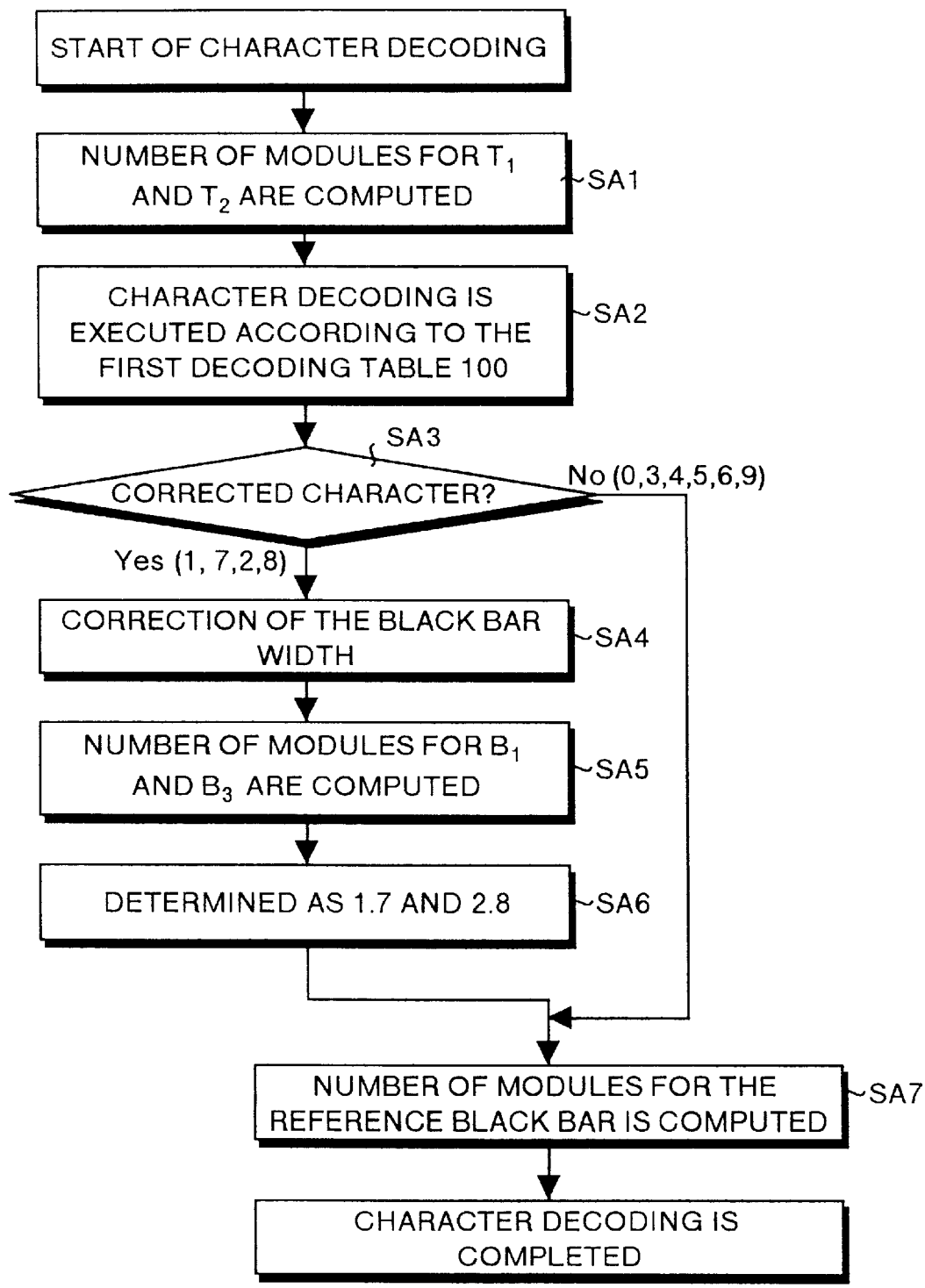
FIG. 13 is a flow chart for explaining operations of a bar code reading apparatus based on the conventional technology.

Now comparative description is made for a case where a character E7 to be decoded shown in FIG. 14 is decoded with a bar code reading apparatus based on the conventional technology to clarify different points between the bar code reading apparatus according to Embodiment 1 of the present invention described above and the conventional type of bar code reading apparatus also described above with reference to the flow chart shown in FIG. 13. Namely, the following description is for a case where correction of a reference black bar width is not made according to a ratio between characters in Embodiment 1 described above.

At first, the CPU 70 (Refer to FIG. 1) shifts to step SA1 shown in FIG. 13, and computes the number of modules for the delta distance $T_1$ and delta distance $T_2$ in the character E7. More specifically, the CPU 70 at first divides the length $C_z$ of the character E7 to be decoded (=211 counts) by 7 (modules) to compute a length of one module in the character E7.

Then, the CPU 70 computes the sum (=116 counts) of the black bar width $B_1$ (=40 counts) and white bar width $B_2$ (=76 counts) as the delta distance $T_1$, and then computes the sum (=118 counts) of the white bar width $B_2$ (=76 counts) and black bar width $B_3$ (=42 counts).

Then the CPU 70 computes the number of modules $T_{1m}$ for the delta distance $T_1$ as four and the number of modules $T_{2m}$ for the delta distance $T_2$ also as four by substituting the delta distance $T_1$, delta distance $T_2$, length of one module (=$C_z/7$) and length of one module (=$C_y/7$) in the character E7 into the equations (1) and (2) described above, and then shifts the processing to step SA2.

In step SA2, the CPU 70 accesses the first decoding table 100 shown in FIG. 10, executes character decoding, and then shifts to step SA3. In this case, as the number of modules $T_{1m}$ is four modules and the number of modules $T_{2m}$ is four modules, the CPU regards a result of decoding as the character E1 or character E7, and then shifts the processing to step SA3.

In step SA3, the CPU 70 determines as to whether the character decoded in step SA2 is a corrected character or not, and in this case, since the character is a corrected character (either the character E1 or character E7), the CPU 70 regards a result of determination in step SA3 as "YES", and shifts the processing to step SA4.

In step SA4, the CPU 70 executes correction of the black bar width B shown in FIG. 14 by referring to the reference black bar width X as a reference.

More specifically, the CPU 70 computes a width difference $\Delta X$ which is a difference between a reference black bar width X and the black bar width $B_1$ by substituting the reference black bar width X (=57 counts), black bar width $B_1$ (=40 counts), and length $C_z$ of the character E7 to be decoded each shown in FIG. 14 into the following equation (4), and then shifts the processing to step SA5.

$$\Delta X=(X-B_1)/(C_z/7) \quad (4)$$

The width difference $\Delta X$ is computed as 0.56 (rounded at the third digit below decimal point).

In step SA5, the CPU 70 computes the number of modules for the reference black bar width X, as the number of modules for the reference black bar width X (described as reference black bar width $X_m$ hereinafter) from the expression of reference black bar width $X/(C_y/7)$, and obtains '2' as a result of computation (=2.02) and according to the determination method shown in FIG. 9.

Then, the CPU 70 computes the number of modules for the corrected black bar width $B_1$ as one from a result (=1.44) of subtracting the width difference $\Delta X$ (=0.56) from the reference black bar width module number $X_m$ (=2 modules) and also according to the determination method shown in FIG. 9. Also the CPU 70 computes a module number for the corrected black width $B_3$ as two according to the same sequence as that for computing the black bar width $B_1$, and then shifts the processing to step SA6.

In step SA6, the CPU 70 applies the black bar width $B_1$ (=1 module) and black bar width $B_3$ (=2 modules) computed in step SA5 to the second decoding table 200 (Refer to FIG. 11).

However, when the black bar width $B_1$ (=1 module) and black bar width $B_3$ (=2 modules) is applied to the second decoding table 200 (Refer to FIG. 11) in the step SA6 described above, as clearly shown in the figure, there can be no corresponding character, and decoding can not be executed. This phenomenon occurs because, in the bar code reading apparatus based on the conventional technology, correction of the black bar width $B_1$ and black bar width $B_3$ is made by referring a reference black bar width X as a reference assuming that widening or narrowing occurs at the same ratio through the bar code 10.

In contrast, with the bar code reading appears according to Embodiment 1 above, a ratio between a length $C_z$ of a character to be decoded and a length $C_y$ of an already decoded character is compared to a threshold value, and a reference black bar width X is corrected according to a result of comparison, so that an operation for decoding a character can correctly be executed without being affected by a non-uniformity in each character length C in the bar code 10.

In the bar code reading apparatus according to the Embodiment 1 above, the number of modules for each bar in the decoded character E1 shown in FIG. 14 is known, so that the operations in step SB15 to step SB20 shown in FIG. 3 may be executed by using, for instance, the reference bar width module number $X_m$ (=2 modules (a theoretical value)) of the already decoded character E1.

Figure 4:
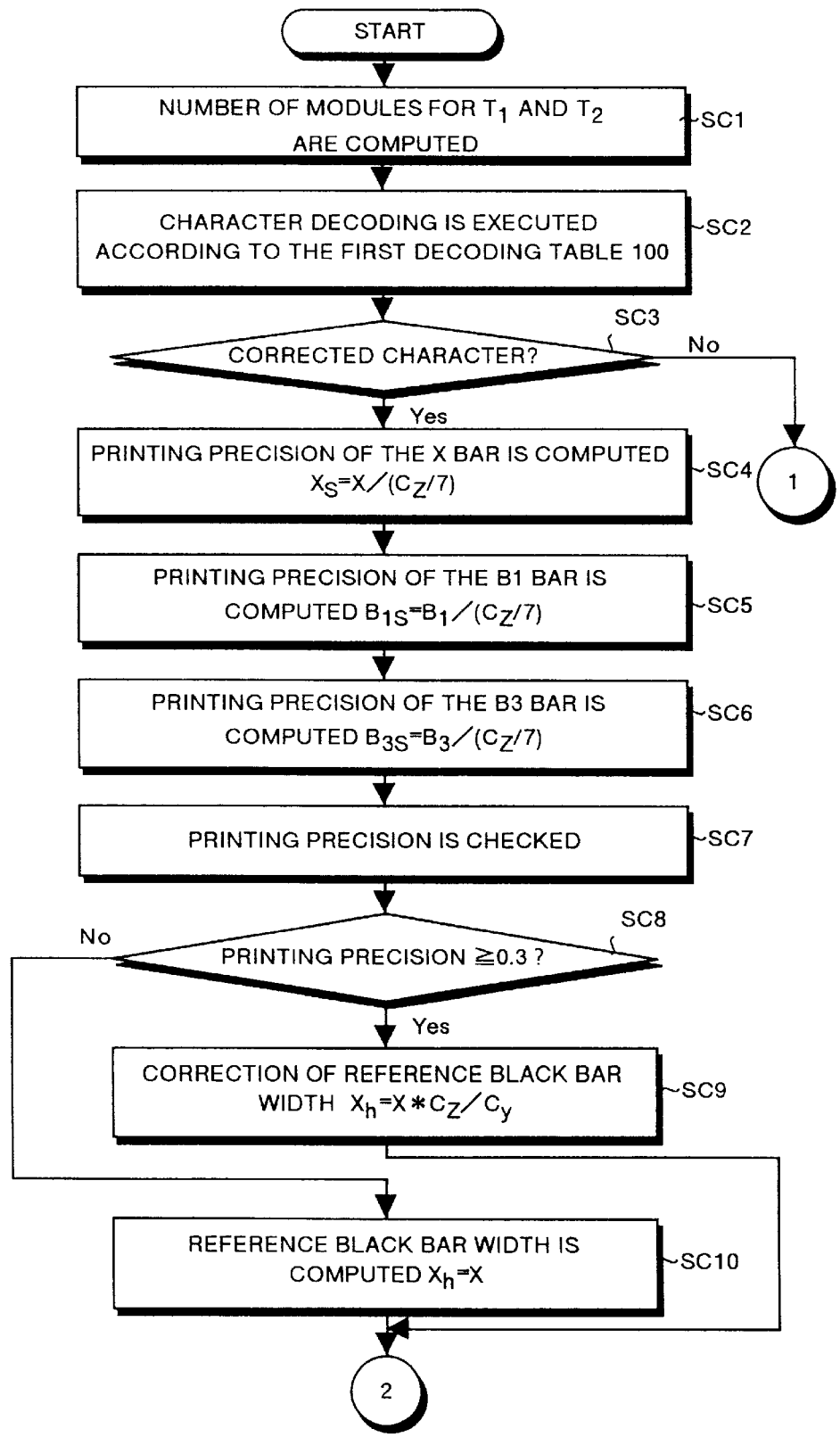
FIG. 4 is a flow chart for explaining the operations of the bar code reading apparatus according to Embodiment 2.

FIG. 4 is a flow chart showing operations of a bar code reading apparatus according to Embodiment 2 of the present invention. Hardware configuration of the bar code reading apparatus according to this Embodiment 2 is the same as the hardware configuration of the bar code reading apparatus according to the Embodiment 1 described above, so that description thereof is omitted herein. However, in the bar code reading apparatus according to Embodiment 2, a portion of operations of the CPU 70 shown in FIG. 1 are different from that of the bar code reading apparatus according to Embodiment 1.

More specifically, in the bar code reading apparatus according to Embodiment 1, in step SB5 shown in FIG. 3 it is determined as to whether the reference black bar width X is to be corrected according to a ratio or not, but in the bar code reading apparatus according to Embodiment 2 described below, determination is made in step SC8 as to whether the reference black bar width X is to be corrected according to printing precision of the bar code 10 or not, and this feature is the main difference from Embodiment 1.

Operations of the bar code reading apparatus according to Embodiment 2 are described with reference to the flow chart shown in FIG. 4. Herein it is assumed that, as a result of counting for the already decoded character E1 shown in FIG. 14, the reference black bar width X (black bar width $B_1'$)=57 counts, white bar width $B_2'$=54 counts, black bar width $B_3'$=56 counts, white bar width $B_4'$=31 counts, and decoded character length $C_y$ =198 counts are stored in the memory 60 shown in FIG. 1.

Similarly, it is assumed herein that, as a result of counting for the character E7 to be decoded, the black bar width $B_1$=40 counts, white bar width $B_2$=76 counts, black bar width $B_3$=42 counts, white bar width $B_4$=53 counts, and length $C_z$ of the character to be decoded=211 counts are stored in the memory 60.

In this state, the CPU 70 (Refer to FIG. 1) shifts the processing to step SC1 shown in FIG. 4, computes the number of modules for the delta distance $T_1$ for the character E7 shown in FIG. 14 as four and also a module number for the delta distance $T_2$ in the character E7 as four, and then shifts the processing to step SC2. In step SC2, the CPU 70 accesses the first decoding table 100 shown in FIG. 10, executes character decoding, and then shifts the processing to step SC3. In this case, as the delta distance $T_1$ is four modules and the delta distance $T_2$ is four modules, the CPU 70 regards a result of decoding as the character E1 or character E7.

In step SC3, the CPU 70 determines as to the character decoded in step SC2 is a corrected character or not, and when a result of determination is "NO", namely when the decoded character is other than the corrected character, the CPU 70 outputs decoding data for the decoded character to a host computer or other related sections now shown in the figure, and then shift the processing to END (OK) shown in FIG. 3 to terminate the operation for decoding the character.

In this case, as the character is a corrected character (either the character E1 or character E7), the CPU 70 regards a result of determination in step SC3 as "YES", and shifts the processing to step SC4. In the following description, a black bar having the reference black bar width X shown in FIG. 14 is described as X bar, and a black bar having the black bar width $B_1$ as $B_1$ bar, and a black bar having the black bar width $B_3$ as $B_3$ bar.

In step SC4, the CPU 70 computes a result of dividing the reference black bar width X (=57 counts) by a count value for one module in the character E7 ($C_z/7=211/7=30.14$ as printing precision for the X bar (=1.89 modules), and then shifts the processing to step SC5. In step SC5, the CPU 70 computes a result of dividing the black bar width $B_1$ (=40 counts) by the count value above ($C_z/7=30.14$) as printing precision for the bar $B_{1s}$ (=1.33 modules), and then shifts the processing to the step SC6.

In step SC6, the CPU 70 computes a result of dividing the black bar width $B_3$ (=42 counts) by the count value ($C_z/7=30.14$) as printing precision for the bar $B_3$, (=1.39 modules), and then shifts the processing to SC7. In step SC7, the CPU 70 checks the printing precision $X_s$, printing precision $B_{1s}$, and printing precision $B_{3s}$ computed in steps SC4 to SC6 respectively. More specifically, the CPU 70 computes an absolute value (=0.56 modules, described as the second printing precision hereinafter) of the difference between the printing precision $X_s$ (=1.89 modules) and printing precision $B_{1s}$ (=1.39), and then shifts the processing to step SC8.

Figure 6:
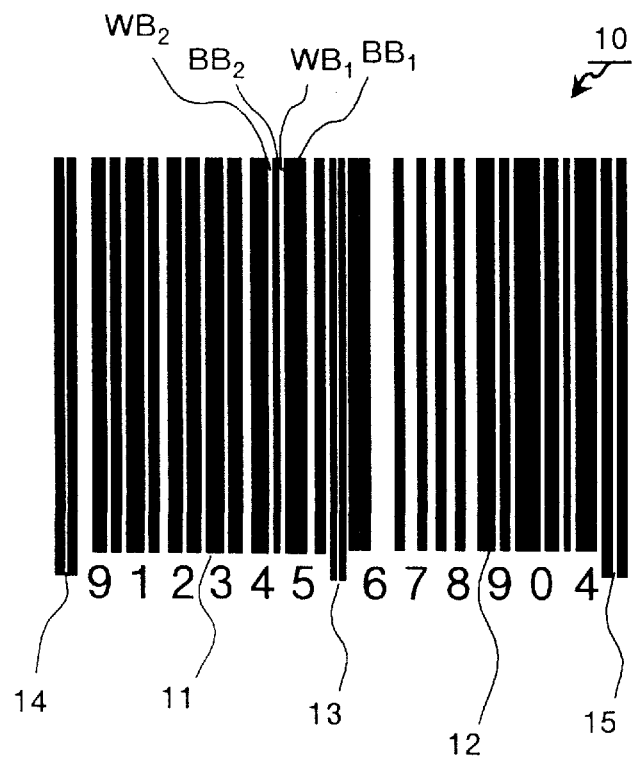
FIG. 6 is a top view showing the bar code 10.
Figure 7A:
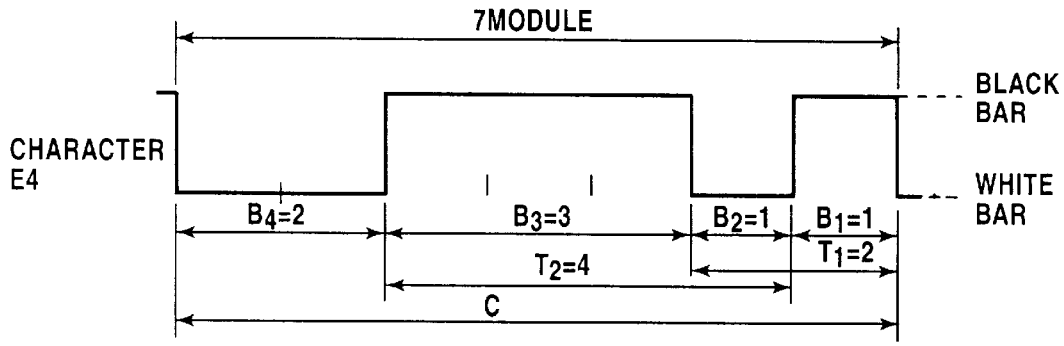
FIG. 7A to FIG. 7D are views showing the characters E4, E6, E2, and E8.
Figure 7B:
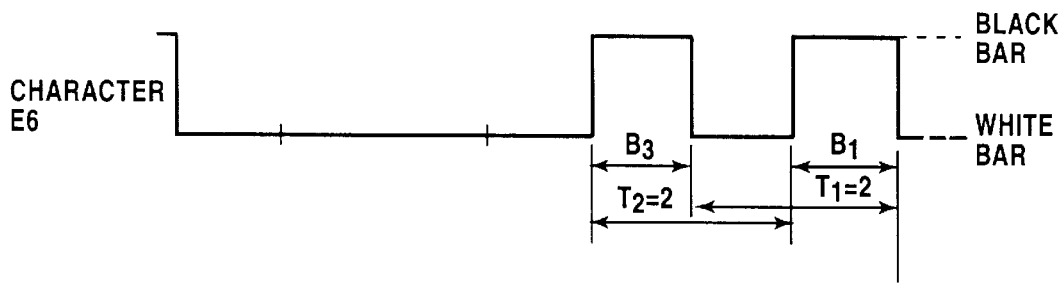
Figure 7C:
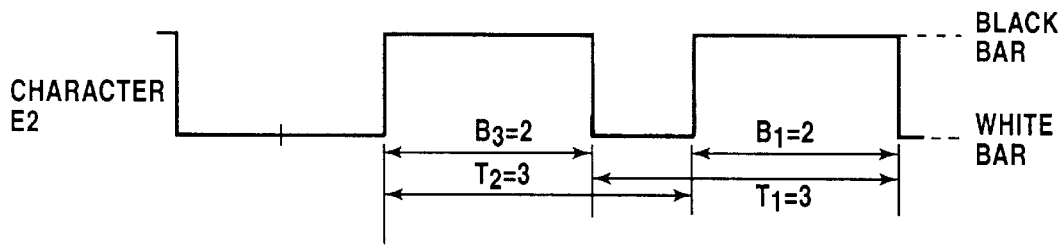
Figure 7D:
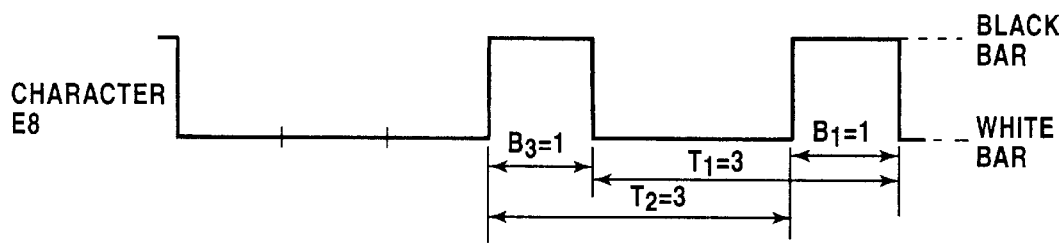

In step SC8, the CPU 70 determines as to whether the first printing precision and (or) the second printing precision computed in step SC7 are less than the threshold value (for instance, 0.3 module) or not. Herein, the threshold value is used to determine whether all the black bars in the bar code 10 shown in FIG. 6 are generally wider (or narrower) or only a portion thereof is wider or narrower as compared to the regular ones.

Namely, when it is determined that all the black bars in the bar code 10 are generally wider (or narrower) as compared to the regular ones, all the character widths C have the same value, while, when only some of the bars are wider or narrower as compared to the regular ones, it is recognized that a non-uniformity in each character length C has been generated.

In this case, as both of the first printing precision (=0.56 modules) and the second printing precision (=0.5 modules) are worst than the threshold value (0.3 modules), the CPU 70 recognizes that there is a non-uniformity between the length $C_y$ of the decoded character and length $C_z$ of the character to be decoded, regards a result of determination in step SC8 as "YES", and shifts the processing to step SC9.

Figure 8:
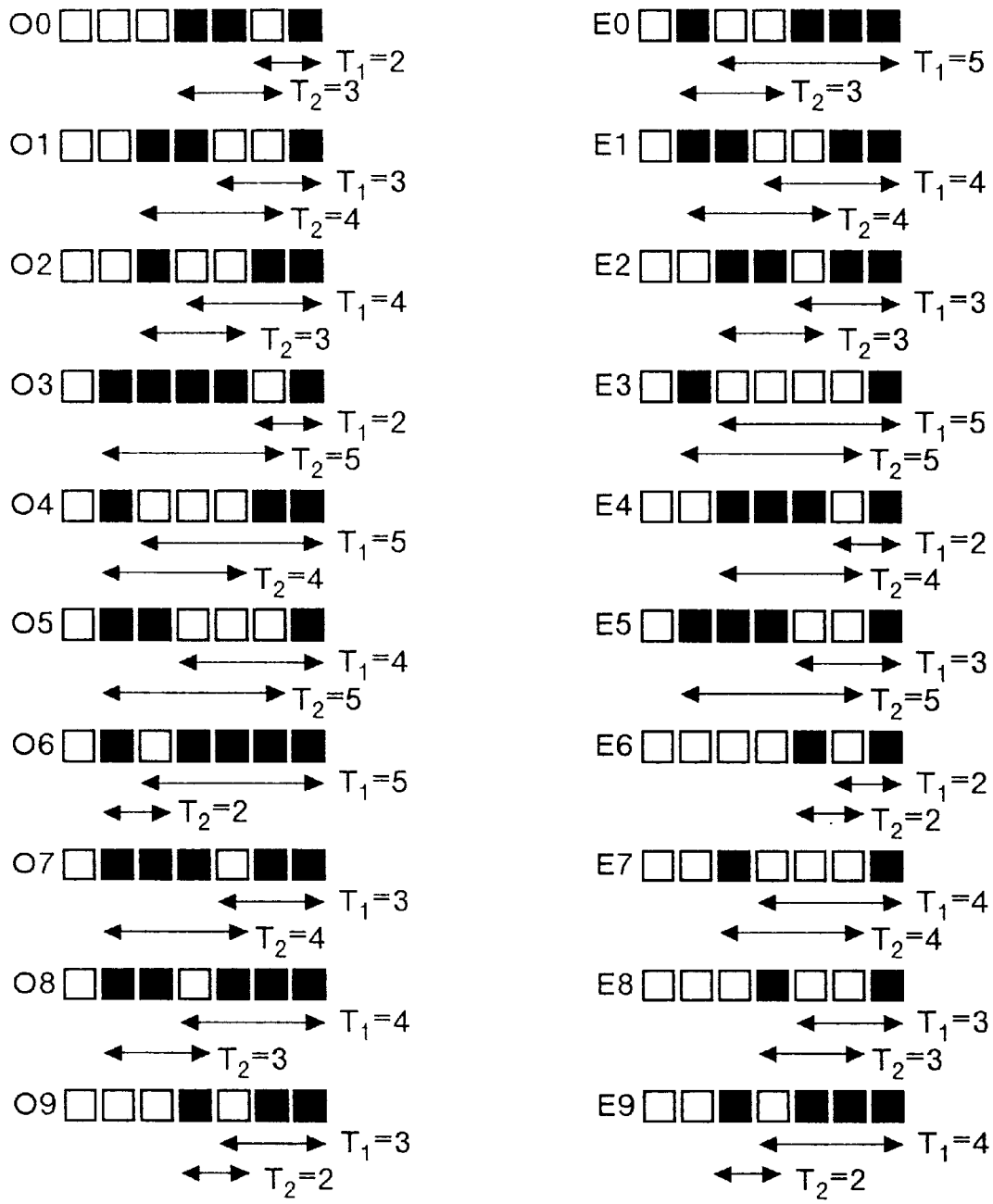
FIG. 8 is a view showing the characters O0 to O9 and characters E0 to E9.

In step SC9, the CPU 7 corrects the reference black bar width X shown in FIG. 14. More specifically, the CPU 70 computes the corrected reference black bar width $X_h$ by substituting the reference lack bar width X (=57 counts), the length $C_y$ of the decoded character (=198 counts), and length $C_z$ of the character to be decoded (=211 counts) into the following equation (3) respectively, and then shifts the processing to step SB8 shown in FIG. 8 to execute the sequence described above.

$$X_h = X \cdot (C_z/C_y) \quad (3)$$

On the other hand, when it is determined in step SC8 that the first printing precision and (or) the second printing precision are less than the threshold value (=0.3 module), the CPU 70 recognizes a result of determination as "NO", and then shifts the processing to step SC10. In step SC10, the CPU 70 corrects the reference black bar width X as the reference black bar width $X_h$, shifts the processing to the step SB8 shown in FIG. 3, and executes the steps described above. Namely, in step SC7, the reference black bar width X is not corrected and is used as the reference black bar width $X_h$ as it is in the following steps.

Figure 5:
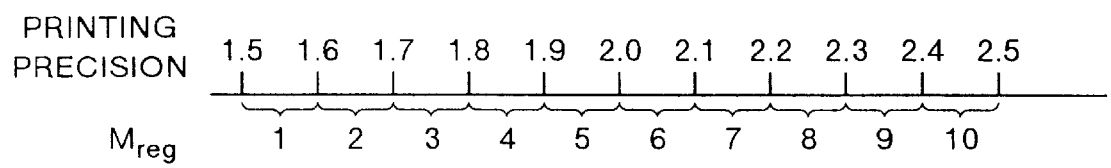
FIG. 5 is a view showing a printing precision table.

It should be noted that, in the bar code reading apparatus according to Embodiment 2 above, the first printing precision and second printing precision described above may be calculated by using the printing precision table shown in FIG. 5.

When the printing precision table shown in FIG. 5 is used, in the step SC7 shown in FIG. 4, a module register $M_{reg}$ is computed from the printing precision $X_s$ (=1.89 modules), printing precision $B_{1s}$ (=1.33 modules), and printing precision $B_{3s}$ (=1.39 modules) computed in steps SC4 to SC6 respectively.

This module register $M_{reg}$ expresses printing precision with a module value, and the module register $M_{reg}$ is "1" when the printing precision is in the range from 1.5 to 1.6, and "2" in the range from 1.6 to 1.7. Similarly, when the printing precision is in the range from 2.4 to 2.5, the module register $M_{reg}$ is "10". It should be noted that, when the printing precision is smaller than 1.5, the module register $M_{reg}$ is "0".

More specifically, the CPU 70 obtains, from the printing precision table shown in FIG. 5, the module register $M_{reg}$ for the printing precision $X_s$ as four, the module register $M_{reg}$ for the printing precision $B_{1s}$ (=1.33) as zero, and the module register $M_{reg}$ for the printing precision $B_{3s}$ (=1.39).

Then, the CPU 70 computes an absolute value (=4 modules: first printing precision) of a difference between the module register $M_{reg}$ (=4) for the printing precision $X_s$ and the module register $M_{reg}$ (=0) for the printing precision $B_{1s}$ and an absolute value (=4 modules: second printing precision) of a difference between the module register $M_{reg}$ (=4) for the printing precision $X_s$ and the module register $M_{reg}$ (=0) for the printing precision $B_{3s}$, and then shifts the processing to step SC8. In step SC8, the CPU 70 determines as to whether the first printing precision and (or) the second printing precision are greater than the threshold value (herein, 3 modules in place of 0.3 module) or not. The threshold value (=3 modules) is used to determine whether all of the black bars in the bar code 10 shown in FIG. 6 are generally wider (or narrower) as described above or not, or as to whether only a portion thereof is wider (or narrower) or not as compared to the regular ones.

In this case, as both of the first printing precision (=4 modules) and second printing precision (=4 modules) are larger than the threshold value (=3 modules), so that the CPU 70 recognizes that there is a non-uniformity between the length $C_y$ of the decoded character and length $C_z$ of the character to be decoded, regards a result of determination in step SC8 as "YES", and then shifts the processing to step SC9 to execute the steps described above.

As described above, with the bar code reading apparatus according to Embodiment 2 described above, the first printing precision and second printing precision are compared to a threshold value, and a reference black bar width X is corrected according to a result of this comparison, so that, like in the bar code reading apparatus according to Embodiment 1 of the present invention described above, an operation for character decoding can correctly be executed without being affected by a non-uniformity in each character length C in the bar code 10.

As described above, with the invention, a ratio between a character width of an already decoded character and that of a character to be decoded is computed, and when this ratio is greater than a threshold value, the first correcting unit corrects a bar width of bars each constituting a character to be decoded by referring to a bar width of the reference bar corrected by the second correcting unit, therefore, there is provided the effect that character decoding can be executed correctly without being affected by a non-uniformity in a width of each character expressed by a bar code.

With the invention, printing precision of a bar code is computed, and when this printing precision is lower than a threshold value, the first correcting unit corrects a bar width of bars each constituting a character to be decoded according to a bar width of the reference bar corrected by the second correcting unit, therefore, there is provided the effect that character decoding can correctly be executed without being affected by a non-uniformity in each character width in a bar code.

With the invention, even when printing precision which is a ratio between a character width of the already decoded character and that of the character to be decoded changes, therefore, there is provided the effect that character decoding can correctly be executed without being affected by a non-uniformity in each character width in a bar code.

With the invention, a ratio between a character width of the already decoded character and a width of character to be decoded is computed, and when this ratio is not less than a threshold value, a correction of the bar width of bars each constituting a character to be decoded is executed in the first correcting step according to the bar width of the reference bar corrected in the second correcting step, therefore, there is provided the effect that character decoding can correctly be executed without being affected by a non-uniformity in each character width in a bar code.

With the invention, printing precision of a bar code is computed, and when the printing precision is worst than a threshold value, a correction of the bar width of bars each constituting a character to be decoded is executed in the first correcting unit according to the bar width of the reference bar corrected in the second correcting unit, therefore, there is provided the effect that character decoding can correctly be executed without being affected by a non-uniformity in each character width in a bar code.

In addition, with the invention, even when the printing precision which is a ratio between a width of the already decoded character and that of a character to be decoded changes, there is provided the effect that character decoding can correctly be executed without being affected by the non-uniformity of a width of each character in a bar code.

This application is based on Japanese patent application No. HEI 10-359710 filed in the Japanese Patent Office on Dec. 17, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar code reading apparatus for decoding a character from a bar code data obtained by reading a bar code which expresses a character with a plurality of bars, said bar code reading apparatus comprising:

a first correcting unit for correcting a bar width of each of the bars constituting a character to be decoded by referring to a bar width of a reference bar as a reference for a bar width in an already-decoded character;

a decoding unit for decoding the character according to a bar width of a bar constituting the character to be decoded corrected by said first correcting unit;

a ratio computing unit for computing a ratio between a width of the already-decoded character and that of the character to be decoded; and a second correcting unit for correcting a bar width of the reference bar according to the ratio computed by said ratio computing unit, wherein said first correcting unit corrects the bar width of the bar constituting the character to be decoded when the ratio computed by said ratio computing unit is greater than or equal to a prespecified threshold value according to the bar width of the reference bar corrected by said second correcting unit.

2. A bar code reading apparatus for decoding a character from a bar code data obtained by reading a bar code which expresses a character with a plurality of bars, said bar code reading apparatus comprising:

a first correcting unit for correcting a bar width of each of the bars constituting a character to be decoded by referring to a bar width of a reference bar as a reference for a bar width in an already-decoded character;

a decoding unit for decoding the character according to a bar width of a bar constituting the character to be decoded corrected by said first correcting unit;

a printing precision computing unit for obtaining a printing precision in the bar code; and a second correcting unit for correcting a bar width of the reference bar according to a ratio between a width of the already-decoded character and that of the character to be decoded, wherein said first correcting unit corrects the bar width of the bar constituting the character to be decoded according to the bar width of the reference bar corrected by said second correcting unit.

3. A bar code reading apparatus according to claim 2; wherein said printing precision computing unit computes the printing precision according to a ratio between a bar width of at least one reference bar constituting the already decoded character and that of the character to be decoded.

4. A bar code reading method of reading a bar code expressing a character with a plurality of bars having different widths comprising:

a first correcting step of correcting a bar width of a character to be decoded by referring to the bar width of at least one reference bar in an already-decoded character;

a decoding step of decoding the character according to a bar width of the already-decoded character corrected in said first correcting step;

a ratio computing step of computing a ratio between a width of the already-decoded character and that of the character to be decoded; and a second correcting step of correcting the bar width of the reference bar according to the ratio computed in said ratio computing step, wherein, when the ratio computed in said ratio computing step is greater than or equal to a prespecified threshold value, the bar width correction in said first correcting step is executed according to the bar width of the reference bar corrected in said second correcting step, and a bar width of a bar constituting the character to be decoded is corrected according to this corrected bar width.

5. A bar code reading method of reading a bar code expressing a character with a plurality of bars having different code widths comprising:

a first correcting step of correcting a bar width of a character to be decoded by referring to the bar width of at least one reference bar in an already-decoded character;

a decoding step of decoding the character according to a bar width of the already-decoded character corrected in said first correcting step;

a printing precision computing step of computing a printing precision in the bar code; and a second correcting step of correcting the bar width of the reference bar according to a ratio between a width of the already-decoded character and that of the character to be decoded, wherein, when the printing precision of the bar code computed in said printing precision computing step is lower than a prespecified threshold value, the bar width correction in said first correcting step is executed according to a bar width of the reference bar corrected in said second correcting step, and a bar width of a bar constituting the character to be decoded is corrected according to this corrected bar width.

6. A bar code reading method according to claim 5, wherein in said printing precision computing step the printing precision is computed according to a ratio between a bar width of at least one reference bar in the already-decoded character and that in the character to be decoded.

* * * * *